Kent D. Broadbent,
INVENTOR.
BY
Leonard Golove
ATTORNEY.

Kent D. Broadbent,
INVENTOR.
BY
Leonard Golove
ATTORNEY.

6a, 6b, 6c, 6d, 6e, 6f, 6g, 6h, 6i, 6j

Kent D. Broadbent,
INVENTOR.
BY.
Leonard Golove
ATTORNEY.

Dec. 13, 1966 K. D. BROADBENT 3,292,161

THIN FILM SHIFT REGISTER

Filed Jan. 19, 1962 4 Sheets-Sheet 4

| TIME | FLIP-FLOP 62 | FLIP-FLOP 72 | "AND" GATE |
|---|---|---|---|
| t1 | 0 | 0 | 84 |
| t2 | 1 | 0 | 80 |
| t3 | 0 | 1 | 82 |
| t4 | 1 | 1 | 78 |

Kent D. Broadbent,
*INVENTOR.*
*BY.*

Leonard Golove

ATTORNEY 3,292,161
THIN FILM SHIFT REGISTER
Kent D. Broadbent, San Pedro, Calif., assignor, by mesne assignments, to Interstate Electronics Corporation, a corporation of California
Filed Jan. 19, 1962, Ser. No. 167,292
12 Claims. (Cl. 340—174)

This invention relates to a magnetic device and more particularly to a device for shifting the position of a magnetic domain established in a magnetic medium from one portion of the medium to another portion thereof.

Devices for shifting the position of a magnetic domain on a magnetic medium have been described. One such device is shown in U.S. Patent Serial No. 2,919,432, entitled "Magnetic Device" by K. D. Broadbent, issued December 29, 1959. Such devices present practical difficulties if they are to be used, for example, as a shift register in digital computing systems or the like, because of problems encountered in their manufacture and use. One very serious problem results from the fact that magnetic domains must be introduced into the magnetic medium by the coercing action of a writing electrode, but that such magnetic domains must not be introduced into the magnetic medium by the coercing action of propagating electrodes. The problem arises because the operation of devices of the type described depends on the fact that the force required to create a magnetic domain is larger than the force required to move the domain, once created.

It is apparent then, that if the necessary creating magnetic field is not significantly larger than the minimum propagating field, it will be extremely difficult or even impossible to construct a practical embodiment of such a device.

U.S. Patent No. 2,919,432 describes a device which yields at best a ratio of far less than two to one between the creating field and the minimum propagating field. While it is possible, with such a ratio, to construct a working shift register, many disadvantages are occasioned by the relatively small operating margin between the creation and propagation fields. First, the construction of a shift register composed of many superimposed layers of extremely thin materials is complicated by the fact that the magnetic and other properties of the materials must be closely controlled, a very difficult achievement with techniques such as vacuum deposition or other presently available methods of manufacture. In addition, layer thicknesses must be accurately maintained and the layers must be uniform throughout. Still another disadvantage is the limitation on the speed of operation of the shift register caused by the fact that the propagating magnetic field must be held to a minimum so that undesired magnetic domains will not be created by the propagating field. This disadvantage results from the fact that speed of operation is directly proportional to the magnitude of the propagating field.

Copending U.S. patent application, Serial No. 106,612, entitled "Magnetic Device," filed May 1, 1961, now U.S. Patent No. 3,092,813, by Kent D. Broadbent, describes an improved shift register using a magnetic medium having special properties. The ratio between the creation fields and the propagation fields is improved to a considerable extent. The particular magnetic medium, the use of which is taught in the above-referenced patent application, is manufactured by magnetically hardening the edges of the magnetic medium. The use of this particular magnetic medium has been found to be effective in solving the problem posed by spurious magnetic domains existing at the edges of the magnetic medium. Effective suppression of the motion of magnetic domain walls present at the edges of the medium has been achieved, yielding a substantial improvement in the operation of magnetic domain propagation devices.

Copending patent application Serial No. 117,202, entitled "Magnetic Device," filed June 15, 1961, new U.S. Patent No. 3,256,483, by Kent D. Broadbent, describes an improved device for determining the magnetic state of a magnetic domain established in a magnetic medium. This patent application teaches the use of a particular magnetic medium, incorporating the use of edge hardening of the magnetic medium, and adds a plurality of relatively thin parallel strips of relatively hard magnetic material in the central portion or information channel of the magnetic medium. This medium not only provides an improved read-out device as described, but may be further adapted to yield a greatly improved magnetic domain position shifting device whose construction and method of operation will be described in detail below.

Thus, an object of the present invention is to provide an improved device for moving magnetic domains in a magnetic medium.

Another object of this invention is to provide a magnetic shift register which is relatively simple to manufacture and while allows considerable variation in the magnetic properties of the magnetic medium and further allows latitude in the uniformity required of the magnetic medium.

Still another object of this invention is to provide an improved magnetic shift register which is capable of operation at considerably higher speeds than prior art devices.

Further and additional objects will become apparent from a study of the following specification and drawings in which.

Figure 4:
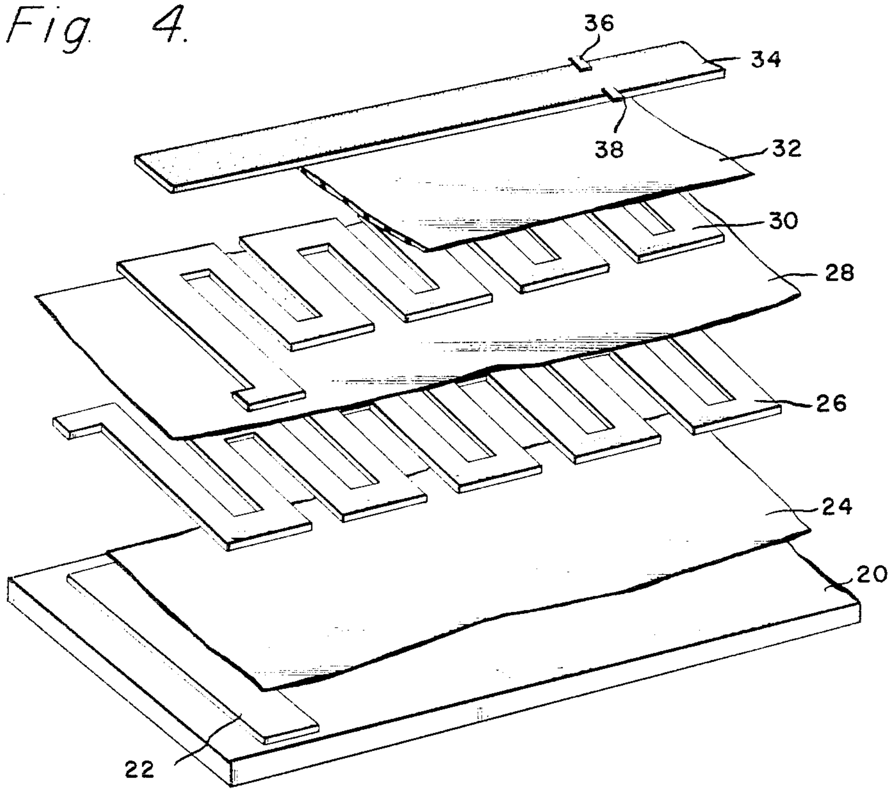
FIG. 4 is a distorted, idealized, exploded and enlarged view of the thin film layers comprising the present invention and indicating a sequential order of deposition.
Figure 5:
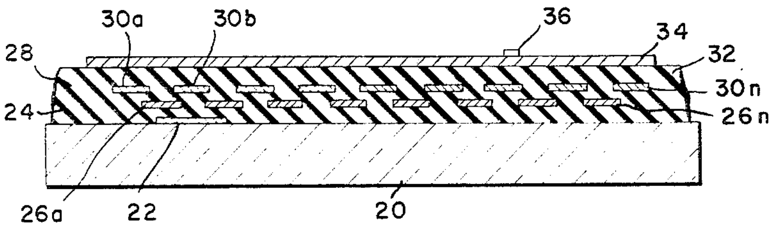
FIG. 5 is an idealized enlarged vertical sectional view of the device shown in FIG. 4.

FIGS. 6*a*–6*j* are idealized, enlarged, vertical sectional views of the magnetic device of FIGS. 4 and 5, showing the operation of the device.

Figures 7, 8:
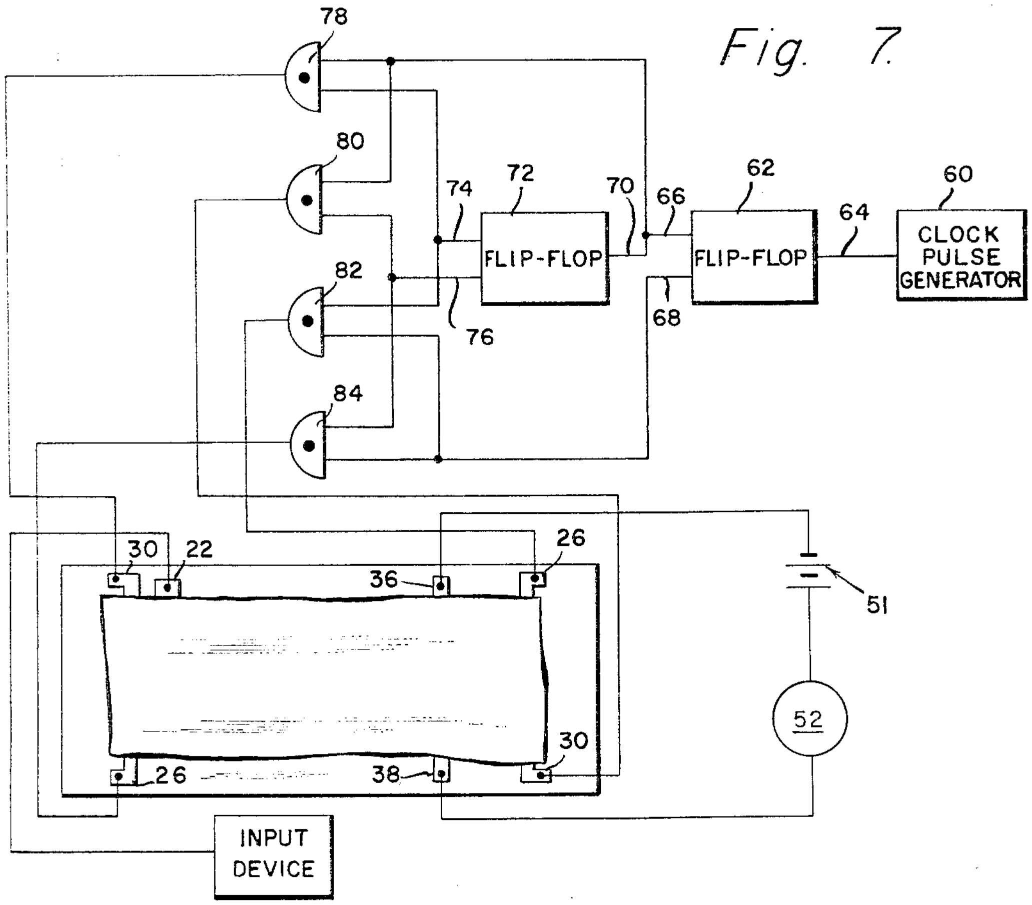

FIG. 7 is a circuit diagram showing the device of FIGS. 4 and 5 in an operative circuit; and FIG. 8 is a table showing the energization of various portions of the circuit of FIG. 7.

The present invention provides the advantages listed above by incorporating a magnetic medium manufactured as described below and having particular properties by virtue of its physical structure and composition. The proper selection of such properties and the manufacture of a device having the selected properties provides an increased ratio between the creation fields and propagation fields to a value much greater than ratios presently attainable by application of the principles taught by the prior art.

In order to explain the nature of the changes in the magnetic medium taught by the present invention as well as the effect of such changes, it is necessary to consider the properties of a magnetic medium in the form of a thin film of magnetic material. As has been discussed above, operation of devices of the type described herein depends upon the preservation of a relatively large ratio between the magnetic fields necessary to create a magnetic domain in the medium and the magnetic field necessary to propagate such a domain within the medium.

A relatively large factor in the magnitude of the creation energy is due to the magnetic domain rotational energy. Considering a uniformly magnetized magnetic layer or film, an antiparallel magnetic domain can be created by rotating the direction of magnetization of a portion of the film to an opposite direction, that is, through 180 degrees. Thus, the energy required to perform such a rotation is obviously the major factor in the creation energy. It should be understood however, that other factors, some of which have already been discussed above, may also contribute to this creation energy. In prior art shift registers, the magnitude of the creation energy was sought to be maintained at as high a value as possible by increasing the magnitude of the domain rotational energy to as high a value as could be achieved. Thus, a magnetic medium was chosen which is anisotropic, that is, the medium is made to provide an "easy" direction of magnetization and a "hard" direction of magnetization. A measure of the anisotropy of a uniaxial anisotropic magnetic film is generally described by the following equation.

$$E=K \sin^2 \theta$$

where K is the anisotropy constant (energy per unit volume) and $\theta$ is the angle between the direction of internal magnetization and the anisotropy axis or "easy" direction of magnetization.

Thus the energy required to rotate a unit volume of the film from magnetization in the "easy" direction through 90 degrees into magnetization in the "hard" direction may be computed.

The anisotropy constant K may also be defined in terms of the "intrinsic anisotropy field," $H_{KI}$, required to turn a given volume of the magnetic film into the hard direction.

$$H_{KI}=\frac{2K}{M}$$

where M is the internal magnetization vector of the magnetic domain.

In devices such as the shift register described herein, it is evidently desirable to make $H_{KI}$ large compared to the wall coercivity $H_W$, in order to inhibit magnetic domain rotational effects in the magnetic films, while still allowing domain wall motion effects. Present techniques, such as deposition of the magnetic film in a magnetic field or deposition at oblique incidence, for achieving uniaxial anisotropy in vacuum deposited thin film layers for this purpose can only yield a magnetic medium in which $H_{KI}$ is only several times $H_W$, and in which the order of magnitude of $H_{KI}$ is only a few oersteds. It is evident that domain transfer devices such as shift registers would be considerably improved if magnetic films could be provided having anisotropy fields much greater than those provided by the techniques described above. The present invention provides a structure which achieves "effective anisotropy fields" of much greater magnitude than the intrinsic anisotropy field, $H_{KI}$. The invention achieves this increased anisotropy field, not by attempting to increase the intrinsic anisotropy field, $H_{KI}$, but by utilization of an entirely separate and distinct technique.

It is well known that any material which has been magnetized is subject to a self-demagnetization force. Since the magnetostatic energy is, in a very general sense, inversely proportional to the length of a magnetic domain L taken in the direction of the magnetic vector M, the smaller the length L, the higher the magnetostatic energy, assuming width and thickness remain constant. Thus, the magnetostatic energy of a relatively long magnetic domain is much less than the magnetostatic energy of a relatively short magnetic domain. Further, the rotation of a relatively long magnetic domain to an orientation which severely restricts the length of the domain, requires that not only must the rotational energy be supplied, but the increase in magnetostatic energy must also be supplied. The additional field to be overcome in rotating, due to the increase in magnetostatic energy from the first orientation to the second, will be called $H_{KD}$, and, as has been described, $H_{KD}$ results principally from the demagnetizing field due to the relatively short length of the magnetic domain in the second orientation. The magnetic field, $H_{KD}$, thus appears as an effective anisotropy field, since it is a magnetic field which must be overcome by the external or driving field, in order to turn the direction of magnetization of the magnetic domain within the magnetic film or layer, through the "hard" direction of magnetization.

It is clear from the above, that the effective anisotropy field, $H_{KE}$, includes both the intrinsic anisotropy field, $H_{KI}$, and the demagnetizing field, $H_{KD}$.

$$H_{KE}=H_{KI}+H_{KD}$$

The magnitude of the demagnetizing field $H_{KD}$, can be shown to depend upon W, the width of the magnetic domain, the internal magnetization vector of the magnetic domain M, and the film thickness T, approximately as follows:

$$H_{KD}=\frac{TM}{W}$$

Assuming typical values for thin magnetic films or layers of $M=5000$ gauss, and $T=1000$ angstroms, it is seen that a width W of 0.2 mm. or about 0.008 inch would result in an $H_{KD}$ of 2.5 oersteds, which is the order of the $H_{KI}$ fields that are commonly obtainable in thin films of the type used in domain propagation devices. However, a width W, of 0.02 mm. or about 0.0008 inch would yield a $H_{KD}$ of 25 oersteds, an order of magnitude greater than presently obtainable values of $H_{KI}$.

The present invention provides a magnetic medium which yields precisely the conditions set out above. That is, in addition to the normal anisotropy of the magnetic film, a structure is provided which forces a magnetic domain to significantly decrease its length in order to rotate. As will also be seen, the effectiveness of the present invention in domain propagation devices depends not only upon the geometric factor W, but also on the fact that micro-domains and domain walls are excluded from the edges of the magnetic strip and that thus the effective anisotropy field, $H_{KE}$, is the controlling factor in determining whether or not a magnetic domain is formed where none existed prior to the application of the exciting field.

Figure 1:
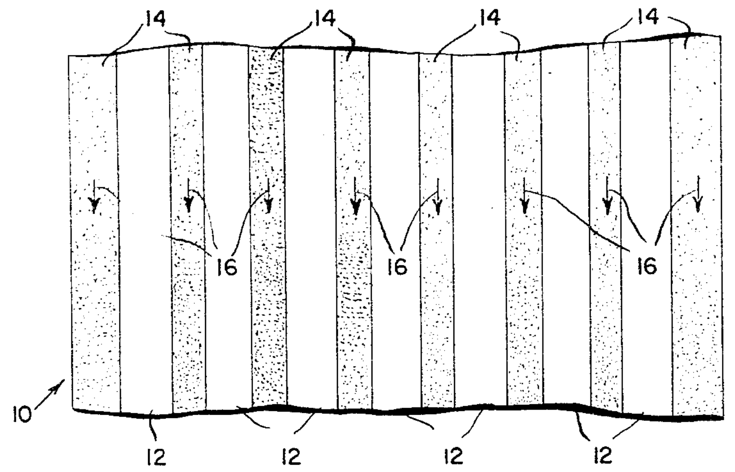
FIG. 1 shows a thin film layer of magnetic material manufactured according to the present invention.
Figure 2:
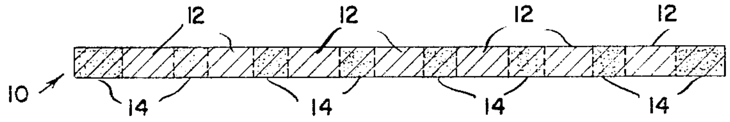
FIG. 2 is a cross-sectional view of the magnetic layer of FIG. 1.

Referring now to FIGS. 1 and 2, there are shown the details of construction of a magnetic medium 10 comprising a plurality of relatively thin portions or strips of magnetically soft material 12, separated by portions or strips of relatively hard magnetic material 14. It should be understood that a "hard" magnetic material is a material or medium exhibiting relatively high magnetic coercive force and that a "soft" magnetic material is a material or medium exhibiting relatively low magnetic coercive force.

Initially, the magnetically hard regions 14 are magnetized in a first direction, shown downward by arrows 16. The hard regions retain their initial magnetization during all normal operation of the device. During the following description of the operation of the device, a "zero state" is represented by a downward polarization of the soft regions 12, shown in FIG. 1. Since the energy required to change the magnetic polarization of a hard region may be made extremely high, operation of the device, which merely requires controlling the magnetic state of the soft regions 12, will not affect the magnetic state of the hard regions 14.

Figure 3:
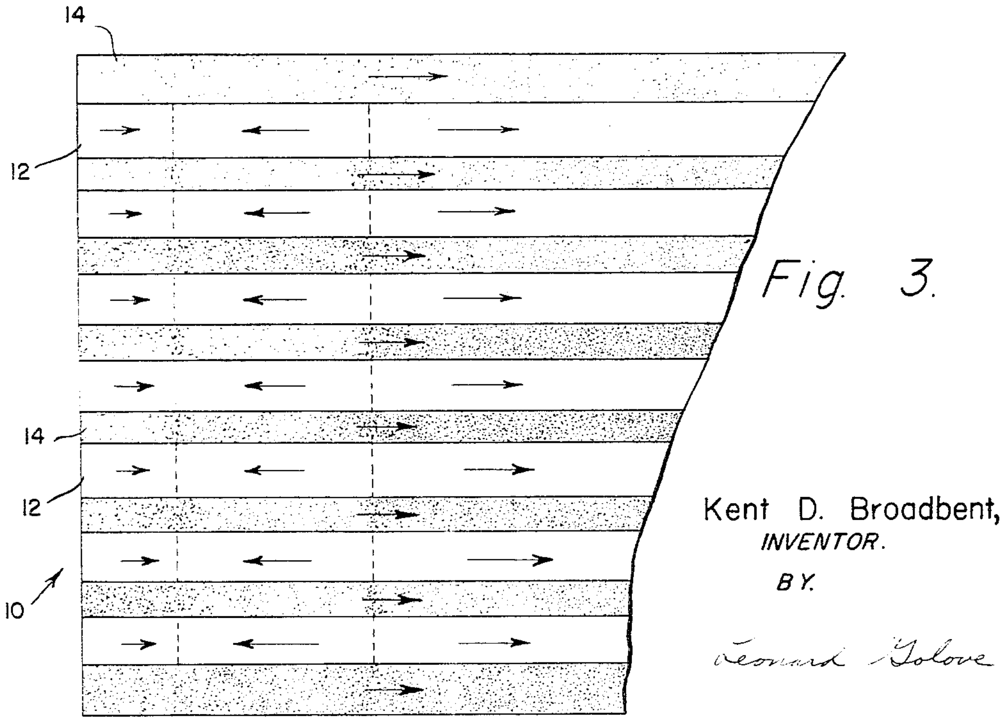
FIG. 3 shows a magnetic domain impressed upon the magnetic layer of FIG. 1.

Referring to FIG. 3, it can be seen that an information bearing magnetized area of the magnetic medium extends transversely across the several portions and comprises a plurality of parallel magnetic domains. Since the length of these magnetic domains may be controlled, the domains may be made to have a relatively high length to width ratio. Thus, a structure is provided which forces a magnetic domain to decrease its length significantly in order to rotate. As has already been stated, the hardening of the edges of the magnetic film layer 10 also excludes micro-domains and domain walls from the edges of the magnetic strip.

Processes which have yielded sufficient hardening of the desired areas of the magnetic medium 10 are well known in the art and have been utilized experimentally for the production of the present invention. Several such processes have been suggested and tested. These include vacuum depositing or otherwise providing a thin film of a hardening element such as copper, aluminum, etc. in those areas in which magnetic hardness is desired, and subsequent heating of the magnetic medium. At relatively high temperatures, the hardening element combines with the magnetic material and produces a "doped" region exhibiting magnetic hardness or high coercive force. Another technique for hardening selected areas consists of decreasing the thickness of those areas desired to be hardened relative to the thickness of the desired soft areas. Still another technique is that of processing portions of the sub-strate surface onto which the magnetic medium is deposited, such as by chemical etching of those portions of the sub-strate surface which underlie the desired hard regions. Such a roughening of the sub-strate surface alters the structure of the deposited magnetic material and increases the magnetic hardness of those regions of the magnetic film which have been deposited on the roughened surface.

In all of the description of the operation of the magnetic devices which have been given heretofore and which are to follow, it is to be understood that, while the explanations given appear to be reasonably and qualitatively correct, the description of magnetization phenomena is highly simplified for the purpose of clarity in explanation. In actuality, magnetic domain formation and interaction is known to be extremely complex and the simple explanation offered herein may not fully describe the operation of this invention. It should be further understood that the simplified description of magnetization phenomena presently believed to account for the operation of this invention is merely supplied for explanatory purposes and that the utility of the invention does not depend upon the accuracy of those principles suggested.

Referring now to FIGS. 4 and 5, there is shown a thin film strip of magnetic material which has been superimposed upon various conducting and insulating layers. In these figures, various dimensions have been distorted so that the details of the invention can be clearly seen.

Investigations have been conducted into the magnetic behavior of ferro-magnetic films deposited on substrates. One such investigation is reported in the Journal of Applied Physics, vol. 26, August 1955, and is entitled "Preparation of Thin Magnetic Films and their Properties" by M. S. Blois, Jr., at pages 975–980.

The device shown in FIGS. 4 and 5 may be manufactured by successive applications of a vacuum deposition technique in which each of the respective magnetic, insulative and conductive layers, shown in FIGS. 4 and 5, are superimposed in an appropriate order. The magnetic layer may be composed of permalloy or other suitable material and may have a thickness of approximately 1000 A. The conductive layers may be composed of aluminum and the insulative layers of silicon monoxide. The thickness of the conductive and insulative layers may be approximately 10,000 A.

The thickness of the magnetic layer 10 is governed at the lower limit by the disappearance of ferromagnetic properties while self-demagnetizing effects and the appearance of significant eddy current losses at the relatively high frequencies used in digital computing devices govern the upper limit of said thickness. Since the entire structure shown in FIG. 4 and 5 is composed of thin films, a carrier or sub-strate 20 is required. The choice of a suitable sub-strate is made according to the considerations referred to in the before-mentioned "Blois" article. For the purpose of this invention, a suitable sub-strate has been found to be a commercially available soft glass which is an insulative medium as required. However, other insulating materials able to withstand higher temperatures may be used.

Upon the sub-strate 20 there is deposited a plurality of conductive, insulative, and magnetic layers which will be described in detail below. With respect to the various conductive layers, it should be pointed out that their order is not critical and can be varied without impairment of the functioning of the device.

The first layer to be deposited is an input electrode which is a conducting layer 22, rectangular in shape, which is used to impress a stable antiparallel magnetic domain in the magnetic layer to be described. Above the conducting layer 22, an insulating layer 24 is deposited. The insulating layer 24 must have a size and shape designed to prevent electrical contact between the conducting layer 22 and the various conducting and magnetic layers which will be superimposed thereupon. Above the insulating layer 25 is superimposed a pair of propagating electrodes 26 and 30, separated by an insulating layer 28, which is shaped to prevent electrical contact between the propogating electrodes 26 and 30. The propagating electrodes 26 and 30, which are formed of conducting materials, each comprise a plurality of parallel electrode portions 26*a*, 26*b*, . . . , 26*n*, and 30*a*, 30*b*, . . . , 30*n* (see FIG. 6), extending transversely across the magnetic medium to be described. The electrode portions are electrically connected to form a continuous conductor in a zig-zag pattern such that current in adjacent electrode portions flows in opposite directions. Thus, a current applied to electrode 26 will pass through each of electrode portions 26*a*, 26*b*, . . . , 26*n*, such that current flows in opposite directions in portions 26*a* and 26*b*, etc., and similarly a current applied to electrode 30 will pass through each of the portions 30*a*, 30*b*, . . . , 30*n*, such that current flows in opposite directions in portions 30*a* and 30*b*, etc. The width of each of the electrode portions must be approximately one-half the width of the input electrode 22. Contiguous electrode portions such as 26*a* and 30*a* must effectively overlap as shown in FIG. 5. As stated, the read-in electrode, conducting layer 22, must have a width approximately twice that of a propagating electrode portion such as 26*a*. However, other embodiments utilizing similar principles of operation can be made using other electrode configurations.

Above the electrode 30 is deposited an insulating layer 32, which must prevent electrical contact between the electrode 30 and superimposed conducting and magnetic layers. Above the insulating layer 32 is deposited a magnetic layer 34, rectangular in shape, which extends across the entire length of the device. The magnetic layer 34 must be constructed as described hereinbefore and shown in FIGS. 1 and 2. Thus, the magnetic layer 34 actually comprises a plurality of parallel portions. The information channels are composed of magnetically soft material which are separated from each other and from the edges of the magnetic layer 34 by channels of magnetically hard material. These channels extend longitudinally along the magnetic layer 34, as shown. A first conducting electrode 36, which may be rectangular in shape, is applied to one side of the magnetic medium 34 and a second conducting electrode 38, which may also be rectangular in shape, is applied to the other side of the magnetic medium 34 such that electrical continuity exists between the electrodes 36 and 38 and the magnetic layer 34. The state of the magnetic medium 34 may be sensed by measuring the electrical resistance between the electrodes 36 and 38.

Figure 6:
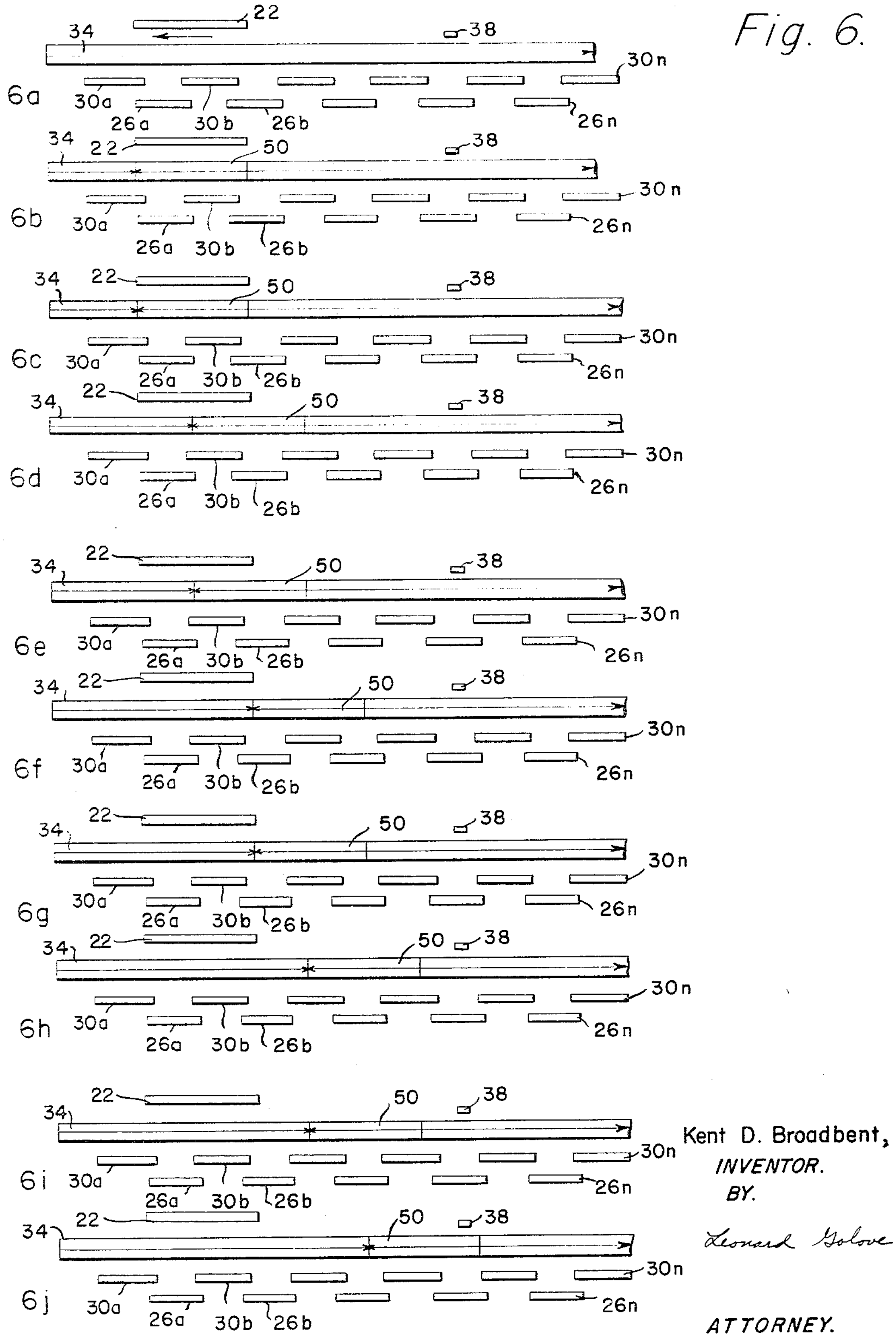

The operation of the shift register shown in FIGS. 4 and 5 is described below with reference to FIGS. 6*a*–6*j*. FIGS. 6*a*–6*j* are schematic representations of a longitudinal cross-section taken through the device of FIGS. 4 and 5 at various times during the operation of the shift register. Note that the conductor 22 is shown above the magnetic layer 34 rather than below that layer. This change is made merely for the purpose of explanatory convenience, and to show a satisfactory alternative arrangement. FIG. 6*a* shows the initial condition of the magnetic medium 34, in which the medium is shown magnetized in a first direction as a single magnetic domain. Binary information will be represented on the medium by considering that an area of magnetization of the medium 34 in a first direction (shown to the right in FIG. 6) denotes a binary "1" and by considering that an area of magnetization of the medium 34 in an opposite or antiparallel direction denotes a binary "0."

In order to record binary information on the medium 34, current is passed through the conductor 22. The passage of current through the conductor 22 causes a magnetic field to appear around the conductor, which field will tend to magnetize the portion of the magnetic sheet 34 adjacent to the conductor 22. By controlling the direction of current in the conductor 22, magnetization may be induced, in the portion of the magnetic sheet 34 adjacent the conductor 22, in either said first direction or said antiparallel direction. In order to record a binary "1," current must be passed through the conductor 22 in such a direction as to cause a magnetic field to pass through the medium in an antiparallel direction, as shown in FIG. 6*a*. A binary "0" can be recorded either by passing current through the conductor 22 in the opposite direction or by not supplying current to the conductor 22, since the magnetic sheet 34 has an initial magnetization in the "0" direction.

The area of antiparallel magnetization produced by appropriate energization of the conductor 22 will be stable and will remain after the inducing current is removed from the conductor 22. FIG. 6*b* shows the condition of the medium after current has been removed from the conductor 22. It can be seen in FIG. 6*b* that a stable area of an anti-parallel state of magnetization 50 has been created in the magnetic medium 34.

FIGS. 6*c*–6*j* show the condition of the magnetic medium and the conditions of the electrodes 26 and 30 at various times between the recording of information by the input electrode 22 and the read-out of information by the output electrode, conductors 36 and 38. FIG. 6*c* shows the first step in the motion cycle which involves actuating the electrode 26 by passing current through the entire electrode 26 in a first direction. From the shape of the electrode shown and described in connection with FIGS. 4 and 5, it can be seen that if electrode portion **26*a* is producing a magnetic field of a first direction, then electrode portion 26*b* will be producing a magnetic field of an antiparallel direction and successive electrode portions (26*c*, 26*d*, . . . , 26*n*) will produce magnetic fields of alternately opposite directions. This is evident from the fact that the electrode is constructed so that current passes in a first direction in the first electrode portion 26*a*** and in an opposite direction in each of the succeeding electrode portions. FIG. 6*c* then shows the actuation of the electrode 26 by the passage of current through the electrode in the first direction. From considerations given above, it can be seen that both boundaries of the antiparallel zone 50 shown in FIG. 6*c* will move from the position shown in FIG. 6*c* to the position shown in FIG. 6*d*.

Referring to FIG. 6*c*, it should be noted that the magnetic film 34 is provided with an initial state of magnetization as shown in FIG. 6*a* by an arrow pointing to the right. A stable antiparallel magnetic domain or zone 50 is then created as shown in FIGS. 6*a* and 6*b*. This zone may be propagated or shifted along the magnetic film 34 by setting up a suitable coercing magnetic field sufficient to allow the zone to move within the magnetic film but not sufficient to create a new zone. The propagation of the zone results from the passage of current through the electrodes 26 and 30 in a particular manner which will be described below and by control of the magnitude of electric current allowed to flow through the propagating electrodes 26 and 30. In FIG. 6*c* it can be seen that the electrode portion **26*a*** has been provided with electric current resulting in a magnetic field shown to the right in FIG. 6*c*. The electrode portion **26*b*** has been provided with electric current resulting in a magnetic field shown to the left in FIG. 6*c*. As has been described above, passage of current through the electrode 26 will result in opposite directions of magnetic field in adjacent electrode portions such as portions **26*a* and 26*b*. The magnetic field produced by the propagating electrode portions 26*a* and 26*b* will result in a motion of the antiparallel zone 50** to the position shown in FIG. 6*d* since the magnetization of the electrode portion **26*a* will cause movement of the left boundary of the antiparallel zone 50 and the energization of the electrode portion 26*b* will cause the motion of the right boundary of the antiparallel zone 50** to the positions shown in FIG. 6*b*.

It should be noted that other electrode portions, such as the electrode **26*n*, will also tend to create zones which would be reversed in magnetization from the adjacent portion of the magnetic film 34. However, since the coercing forces supplied by the propagating electrode portions 26*a*–26*n*, are less than that coercing force required to create a magnetic domain or zone in the absence of a domain wall, no stable magnetization of the magnetic film 34 which might tend to be created, will actually appear when the current is removed from the propagating electrode portions 26*a*–26*n***.

As has been discussed above, the structure of the magnetic film 34 taught by the present invention ensures that portions of the propagating electrodes 26 and 30 will not create stable magnetic domains at locations such as adjacent electrode portion **26*n* in the magnetic film 34 which are not adjacent already existing domain walls. It is evident that the larger the ratio of creation field to propagation field, the less undesired stable magnetic domains will tend to be created in the magnetic film 34 by the action of the propagating electrodes 26 and 30, resulting in errors in the information carried in the magnetic layer 34**. The structure described herein significantly increases this ratio over the prior art. Thus higher information propagation speeds can be attained since the attainment of such higher speeds is accomplished by the use of larger propagating fields than the minimum required for propagation. If necessary, some of the higher ratio can be sacrificed to ease the precision and tolerances in the thickness uniformity or magnetic properties of the various thin film layers used. Thus the gain in ratio provided by the present invention may be utilized to provide a larger margin for error in information propagation, to provide increased operating speed, or to provide greater latitude in the constructional tolerances of the device.

During the next step in the motion cycle, the electrode 30 is actuated by passing current through the electrode in the first direction. This passage of current produces opposite magnetic fields at each of the adjacent electrode portions and causes the motion of the stable magnetic zone from the position shown in FIG. 6*e* to the position shown in FIG. 6*f* as described above. During the next interval of the motion cycle, the electrode 26 is again actuated but in the opposite direction, producing a movement of the stable antiparallel magnetic domain or zone 50 from the position shown in FIG. 6*g* to the position shown in FIG. 6*h* and as described in connection with FIGS. 6*c* and 8*d*. During the last portion of the motion cycle, the electrode 30 is actuated in the opposite direction, producing a movement of the stable antiparallel magnetic zone 50 from the position shown in FIG. 6*i* to the position shown in FIG. 6*j*.

During this portion of the motion cycle, it can be seen that the stable antiparallel magnetic zone 50 has passed the output element composed of conductors 36 and 38. Since a change in magnetization has occurred in the area between the output conductors 36 and 38, a change in impedance will take place between the conductors 36 and 38. This impedance change can be used to determine the condition or direction of magnetization of the medium. Thus, a shift register of any length may be fabricated. It should be appreciated also that, while the description above only included a single input pulse, in practice a succession of pulses representing binary numbers would, in fact, be used. Thus, some time after a first antiparallel magnetic domain has been moved out of the input area, as shown in FIG. 6*h*, a second antiparallel domain may be created in the medium. Thus, a series of domains may be created and propagated. This required time spacing is approximately equal to the width of a stable domain.

The circuitry for sensing the magnetic state of the magnetic film 34 is shown in FIG. 7. The state of the medium 34 is sensed by measuring the electrical resistance between the electrodes 36 and 38. This can be accomplished by passing an electric current between the electrodes 36 and 38, while observing the current between the electrodes. A change in resistance between the electrodes 36 and 38, i.e., in the magnetic medium, will produce a consequent change in current. Thus a battery 51 supplies electric current to the electrodes 36 and 38 and a suitable ammeter 52 measures the current between the electrodes 36 and 38. In operation, more sophisticated circuits for measuring the resistance between the electrodes 36 and 38 may be employed.

The circuitry for supplying the proper energization of the propagating electrodes 26 and 30 will now be described. This circuitry must supply, at a first time, an electric current of a first direction to the electrode 26. At a second time, electric current of the first direction must be supplied to the electrode 30. At a third time, electric current of a second (opposite) direction must be supplied to the electrode 26. At a fourth time, electric current of the second direction must be supplied to the electrode 30.

One embodiment of circuitry which will supply the above-defined currents comprises a clock pulse generator 60 which supplies a series of electrical pulses. The clock pulse generator 60 is connected to a first flip flop 62 which is of the type having a single input 64 and two complementary outputs 66 and 68. As is well known in the art, such a flip flop will change state whenever it receives an input pulse. Thus, upon receiving a first pulse, the output 66 assumes a relatively high voltage and the output 68 assumes a relatively low voltage. Upon receiving a second pulse, the output will be reversed; that is, the output 66 will assume a relatively low voltage and the output 68 will assume a relatively high voltage. Upon receiving successive pulses, the status of the outputs 66 and 68 will correspondingly reverse.

The output 66 is connected to input 70 of a second flip flop 72, which has outputs 74 and 76. The flip flop 72, which operates upon a decrease in voltage, will change state, that is, the relative voltages of its outputs, whenever the output 66 of the flip flop 62 changes its state from a relatively high voltage to a relatively low voltage. Such a change of state of the flip flop 72 occurs upon every second clock pulse supplied to the flip flop 62. Thus, if we consider that a first clock pulse sets both flip flops 62 and 72 to a condition when the outputs 66 and 74 are both relatively low, the second clock pulse will set the flip flop 62 to a condition in which the output 66 is relatively high and will not affect the flip flop 72, leaving the output 74 in a low state. A third clock pulse will set the flip flop 62 to a condition in which the output 66 is relatively low and will set the flip flop 72 to a condition in which the output 74 is relatively high. A fourth clock pulse will set the flip flop 62 to a condition in which the output 66 is relatively high and will not affect the flip flop 72, leaving the output 74 in a high state. A fifth clock pulse will set both outputs 66 and 74 to a relatively low condition, initiating another cycle.

The outputs 66 of flip flop 62 and 74 of flip flop 72 are connected to the inputs of a first conventional "and" gate 78. The outputs 66 of flip flop 62 and 76 of flip flop 72 are connected to the input of a second "and" gate 80. The output 68 of the flip flop 62 and output 74 of the flip flop 72 are connected to the inputs of a third "and" gate 82. The output 68 of the flip flop 62 and the output 76 of the flip flop 72 are connected to the inputs of a fourth "and" gate 84.

In FIG. 8, column I identifies the particular times constituting an operating cycle of the propagating electrodes 26 and 30. Column II shows the state of the flip flop 62, a "0" representing a relatively low voltage at the output 66 and a relatively high voltage at output 68, and a "1" representing a relatively high voltage on the output 66 and a relatively low voltage on the output 68. Column III shows the state of the flip flop 72 with "0" representing a state in which output 74 has a relatively low voltage and output 76 has a relatively high voltage, and "1" representing a state in which output 74 has a relatively high voltage and output 76 has a relatively low voltage.

Since, in general, an "and" gate will provide a relatively high voltage at its output only when all of its inputs are supplied with a relatively high voltage, column IV shows which of the "and" gates will provide a relatively high voltage at its output for each of the four possible states of the flip flops 62 and 72. It can be seen that only one "and" gate can possible provide a relatively high voltage at a particular time and that the other "and" gates have a relatively low voltage on other outputs. Thus, at time 1, the "and" gate 84 has a relatively high voltage and is connected to one terminal of the propagating electrode 26. A return path is provided from the other terminal of the propagating electrode 26 to the "and gate 82 which has a relatively low voltage at its output. At time 2, the "and" gate 80 is connected to one terminal of the propagating electrode 30 and supplies a relatively high voltage to its terminal. The return path is provided from the other terminal of the propagating electrode 30 to the "and" gate 78 which has a relatively low voltage at its output. At time 3, a relatively high voltage is supplied by the "and" gate 82, to one terminal of the propagating electrode 26 which has a return path from its opposite terminal to the "and" gate 84. At time 4, a relatively high voltage is supplied by the "and" gate 78 to one terminal of the propagating electrode 30 which has a return path from its opposite terminal to the "and" gate 80. It can be seen that the directions of current produced by the voltages described provide proper actuation of the propagating electrodes.

The vacuum evaporation technique employed in constructing this novel magnetic element is conventional and well-known in the art. Sufficient to say for the purposes of this invention that the magnetic element may be built up by the sequential evaporation of each thin film layer by means of an individual mask having the configuration of the desired layer to be deposited. However, thin film devices may also be produced by other techniques than vacuum deposition. For example, the required configuration of conducting, insulating and magnetic films may be produced by such processes or combinations of processes as electro-deposition, electrophoresis, silk screening techniques, or various inking, sketching, and printing techniques which allow thin planes of materials to be defined, registered and applied upon a subsurface.

It should be noted that the dimensions given herein above for the various thin film layers are not to be construed as limited thereto but are merely indicative of a preferable structure compatible with thin film considerations. The order of depositing the various layers may also be varied from the order described.

It will now be appreicated that a novel and improved thin film magnetic element has been disclosed. This element may employ a pair of propagating electrodes, as shown, or it may be constructed with a pair of propagating electrodes on each side of the magnetic layer. In such a case, electrode 26 would have an associated electrode disposed in a vertical alignment and in electrical continuity with the electrode 26. Similarly, the electrode 30 would have an associated electrode disposed in vertical alignment and in electrical continuity with the electrode 30. The use of a pair of electrodes should provide sharper and better defined magnetized zones.

While the operation of the device as a shift register has been shown in a 4-beat cycle, it should be understood that other cycles containing different numbers of beats (electrode actuation patterns) may be used.

In the device described, due to magnetic domain spacing conditions within the magnetic medium, information is obtained from the medium only once every four propagating pulses. By using four magnetic channels or thin film strips in parallel to carry the magnetic domains and by staggering the read-in and read-out electrodes, information can be obtained from the register at the maximum bit rate.

What is claimed is:

1. A magnetic device comprising an elongated magnetic medium, said medium comprising a plurality of portions alternatively magnetizable in either of two states of magnetization and extending longitudinally along said medium and having a relatively low magnetic hardness, a separating portion extending longitudinally along said medium between each portion of said plurality adjacent another such portion and having a relatively high magnetic hardness, said separating portion having a first state of magnetization; input means magnetically coupled to said magnetic medium at a first predetermined place thereof for establishing in said plurality of portions an area of a second state of magnetization; output means responsive to the state of magnetization of said magnetic medium at a second predetermined place thereof, spaced from said first predetermined place by a continuous portion of said magnetic medium; and means magnetically coupled to said magnetic medium along said continuous portion thereof for moving the area of said second state of magnetization from said first predetermined place to said second predetermined place on said magnetic medium within said continuous portion thereof.

2. A magnetic device comprising an elongated magnetic medium, said medium comprising two portions extending longitudinally along said medium and having a relatively low magnetic hardness, said two portions adapted to assume first and second states of magnetizations, and a separating portion extending longitudinally along said medium between said two portions and having a relatively high magnetic hardness, said separating portion having said first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof, spaced from said first predetermined place by a continuous portion of said magnetic medium, and means magnetically coupled to said magnetic medium along said continuous portion thereof for moving the area of said second state of magnetization from said first predetermined place to said second predetermined place on said magnetic medium within said continuous portion thereof.

3. A magnetic device comprising an elongated magnetic medium comprising a plurality of portions extending longitudinally along said medium and having a relatively low magnetic hardness, said plurality of portions adapted to assume first and second states of magnetization, and a separating portion extending longitudinally along said medium between each portion of said plurality adjacent another such portion, said separating portion having a relatively high magnetic hardness and further having said first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof, spaced from said first predetermined place by a continuous portion of said magnetic medium; and means magnetically coupled to said magnetic medium along said continuous portion thereof for moving the area of said second state of magnetization from said first predetermined place to said second predetermined place on said magnetic medium within said continuous portion thereof.

4. A magnetic device comprising an elongated magnetic medium, said medium comprising a plurality of portions and alternatively magnetizable in either of two states of magnetization extending longitudinally along said medium and having a relatively low magnetic hardness and a separating portion extending longitudinally along said medium between each portion of said plurality adjacent another such portion, and having a relatively high magnetic hardness, said separating portion having a first state of magnetization; input means responsive to electrical signals and magnetically coupled to said magnetic medium at a first predetermined place thereof for establishing in said plurality of portions an area of a second state of magnetization in accordance with said electrical signals; output means responsive to the state of magnetization of said magnetic medium at a second predetermined place thereof spaced from said first predetermined place by a continuous portion of said magnetic medium for providing electrical signals in accordance with said state of magnetization; and means magnetically coupled to said magnetic medium along said continuous portion thereof for moving the area of said second state of magnetization from said first predetermined place to said second predetermined place on said magnetic medium within said continuous portion thereof.

5. A magnetic device comprising an elongated magnetic medium, said medium comprising two portions extending longitudinally along said medium and having a relatively low magnetic hardness, said two portions adapted to assume first and second states of magnetizations, and a separating portion extending longitudinally along said medium between said two portions and having a relatively high magnetic hardness, said separating portion having said first state of magnetization; input means responsive to electrical signals and magnetically coupled to said magnetic medium at a first predetermined place thereof for establishing in said magnetic medium an area of a second state of magnetization in accordance with said electrical signals; output means responsive to the state of magnetization of said magnetic medium at a second predetermined place thereof, spaced from said first predetermined place by a continuous portion of said magnetic medium for providing electrical signals in accordance with said state of magnetization; and means magnetically coupled to said magnetic medium along said continuous portion thereof for moving the area of said second state of magnetization from said first predetermined place to said second predetermined place on said magnetic medium within said continuous portion thereof.

6. A magnetic device comprising an elongated magnetic medium comprising a plurality of portions extending longitudinally along said medium and having a relatively low magnetic hardness, said plurality of portions adapted to assume first and second states of magnetization, and a separating portion extending longitudinally along said medium between each portion of said plurality adjacent another such portion, said separating portion having a relatively high magnetic hardness and further having said first state of magnetization; input means responsive to electrical signals and magnetically coupled to said magnetic medium at a first predetermined place thereof for establishing in said magnetic medium an area of a second state of magnetization in accordance with said electrical signals; output means responsive to the state of magnetization of said magnetic medium at a second predetermined place thereof, spaced from said first predetermined place by a continuous portion of said magnetic medium for providing electrical signals in accordance with said state of magnetization; and means magnetically coupled to said magnetic medium along said continuous portion thereof for moving the area of said second state of magnetization from said first predetermined place to said second predetermined place on said magnetic medium within said continuous portion thereof.

7. A magnetic device comprising an elongated magnetic medium, said medium comprising a plurality of portions and alternatively magnetizable in either of two states of magnetization and extending longitudinally along said medium and having a relatively low magnetic hardness and a separating portion extending longitudinally along said medium between each portion of said plurality adjacent another such portion, and having a relatively high magnetic hardness, said separating portion having a first state of magnetization; input means magnetically coupled to said magnetic medium at a first predetermined place thereof for establishing in said plurality of portions an area of a second state of magnetization; output means responsive to the state of magnetization of said magnetic medium at a second predetermined place thereof spaced from said first predetermined place by a continuous portion of said magnetic medium; and means magnetically coupled to said magnetic medium along said continuous portion thereof for moving the area of said second state of magnetization from said first predetermined place to said second predetermined place on said magnetic medium within said continuous portion thereof, said moving means being arranged and defined with respect to said medium to be effective to shift the position of said area in steps.

8. A magnetic device comprising an elongated magnetic medium, said medium comprising two portions extending longitudinally along said medium and having a relatively low magnetic hardness, said two portions adapted to assume first and second states of magnetizations, and a separating portion extending longitudinally along said medium between said two portions and having a relatively high magnetic hardness, said separating portion having said first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof, spaced from said first predetermined place by a continuous portion of said magnetic medium; and means magnetically coupled to said magnetic medium along said continuous portion thereof for moving the area of said second state of magnetization from said first predetermined place to said second predetermined place on said magnetic medium within said continuous portion thereof, said moving means being arranged and defined with respect to said medium to be effective to shift the position of said area in steps.

9. A magnetic device comprising an elongated magnetic medium comprising a plurality of portions extending longitudinally along said medium and having a relatively low magnetic hardness, said plurality of portions adapted to assume first and second states of magnetization, and a separating portion extending longitudinally along said medium between each portion of said plurality adjacent another such portion, said separating portion having a relatively high magnetic hardness and further having said first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof, spaced from said first predetermined place by a continuous portion of said magnetic medium; and means magnetically coupled to said magnetic medium along said continuous portion thereof for moving the area of said second state of magnetization from said first predetermined place to said second predetermined place on said magnetic medium within said continuous portion thereof, said moving means being arranged and defined with respect to said medium to be effective to shift the position of said area in steps.

10. A magnetic device comprising an elongated magnetic medium, said medium comprising a plurality of portions alternatively magnetizable in either of two states of magnetization and extending longitudinally along said medium and having a relatively low magnetic hardness and a separating portion extending longitudinally along said medium between each portion of said plurality adjacent another such portion, and having a relatively high magnetic hardness, said separating portion having a first state of magnetization; input means magnetically coupled to said magnetic medium at a first predetermined place thereof for establishing in said plurality of portions an area of a second state of magnetization; output means responsive to the state of magnetization of said magnetic medium at a second predetermined place thereof, spaced from said first predetermined place by a continuous portion of said magnetic medium; and a plurality of propagating electrodes magnetically coupled to said magnetic medium along said continuous portion thereof for moving the area of said second state of magnetization from said first predetermined place to said second predetermined place on said magnetic medium within said continuous portion thereof, each of said plurality of electrodes arranged to be effective upon energization thereof to produce a coercive force in said medium on overlapping portions of said medium.

11. A magnetic device comprising an elongated magnetic medium, said medium comprising two portions extending longitudinally along said medium and having a relatively low magnetic hardness, said two portions adapted to assume first and second states of magnetizations, and a separating portion extending longitudinally along said medium between said two portions and having a relatively high magnetic hardness, said separating portion having said first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof, spaced from said first predetermined place by a continuous portion of said magnetic medium; and a plurality of propagating electrodes magnetically coupled to said magnetic medium along said continuous portion thereof for moving the area of said second state of magnetization from said first predetermined place to said second predetermined place on said magnetic medium within said continuous portion thereof, each of said plurality of electrodes arranged to be effective upon energization thereof to produce a coercive force in said medium on overlapping portions of said medium.

12. A magnetic device comprising an elongated magnetic medium comprising a plurality of portions extending longitudinally along said medium and having a relatively low magnetic hardness, said plurality of portions adapted to assume first and second states of magnetization, and a separating portion extending longitudinally along said medium between each portion of said plurality adjacent another such portion, said separating portion having a relatively high magnetic hardness and further having said first state of magnetization; input means magnetically coupled to said magnetic medium at a first predetermined place thereof for establishing in said magnetic medium an area of a second state of magnetization; output means responsive to the state of magnetization of said magnetic medium at a second predetermined place thereof, spaced from first predetermined place by a continuous portion of said magnetic medium; and a plurality of propagating electrodes magnetically coupled to said magnetic medium along said continuous portion thereof for moving the area of said second state of magnetization from said first predetermined place to said second predetermined place on said magnetic medium within said continuous portion thereof, each of said plurality of electrodes arranged to be effective upon energization thereof to produce a coercive force in said medium on overlapping portions of said medium.

References Cited by the Examiner

UNITED STATES PATENTS

| | | | |
|---|---|---|---|
| 2,972,736 | 2/1961 | Hersh | 179—100.2 |
| 3,092,813 | 6/1963 | Broadbent | 340—174 |

BERNARD KONICK, *Primary Examiner.*

IRVING SRAGOW, *Examiner.*

M. K. KIRK, S. M. URYNOWICZ, *Assistant Examiners.*